(12) United States Patent
Getsinger

(10) Patent No.: US 7,335,297 B2
(45) Date of Patent: Feb. 26, 2008

(54) POWER AQUARIUM CLEANING/GRAVEL VACUUM

(76) Inventor: Fred C. Getsinger, 20569 Cedarbrook Ter., Cupertino, CA (US) 95014

( * ) Notice: Subject to any disclaimer, the term of this patent is extended or adjusted under 35 U.S.C. 154(b) by 455 days.

(21) Appl. No.: 11/068,061

(22) Filed: Feb. 28, 2005

(65) Prior Publication Data
US 2005/0218053 A1    Oct. 6, 2005

Related U.S. Application Data

(60) Provisional application No. 60/549,097, filed on Mar. 1, 2004.

(51) Int. Cl.
*A01K 63/04*    (2006.01)
(52) U.S. Cl. .............. 210/167.21; 210/416.2; 119/259; 134/111
(58) Field of Classification Search ............ 119/259; 210/167.71, 167.21, 416.2; 134/111
See application file for complete search history.

(56) References Cited

U.S. PATENT DOCUMENTS 3,734,853 A * 5/1973 Horvath ............ 210/167.25
4,094,788 A * 6/1978 Dockery ............ 210/167.21
6,202,677 B1   3/2001 Chen et al.
2005/0218053 A1  10/2005 Getsinger

FOREIGN PATENT DOCUMENTS

WO   WO 2005/084425   9/2005

* cited by examiner

*Primary Examiner*—Terry K Cecil
(74) *Attorney, Agent, or Firm*—Swernofsky Law Group PC

(57) ABSTRACT

A gravel vacuum, including a pump, a detachable suction base connected to the pump to which a suction tube can be attached, a filter connected to the suction base, a return assembly, at least one valve, and an alternate flow path. The pump impels a flow of water from the suction base, through the filter, and out the return assembly. The valve permits adjustment of volume of the flow for different sizes of fish aquariums. The alternate flow path reduces back pressure on the pump when the valve is used to adjust the volume of the flow. Also, a method of using the gravel vacuum.

21 Claims, 12 Drawing Sheets

POWER AQUARIUM CLEANING/GRAVEL VACUUM

CROSS-REFERENCE TO RELATED APPLICATIONS

Figure 1:
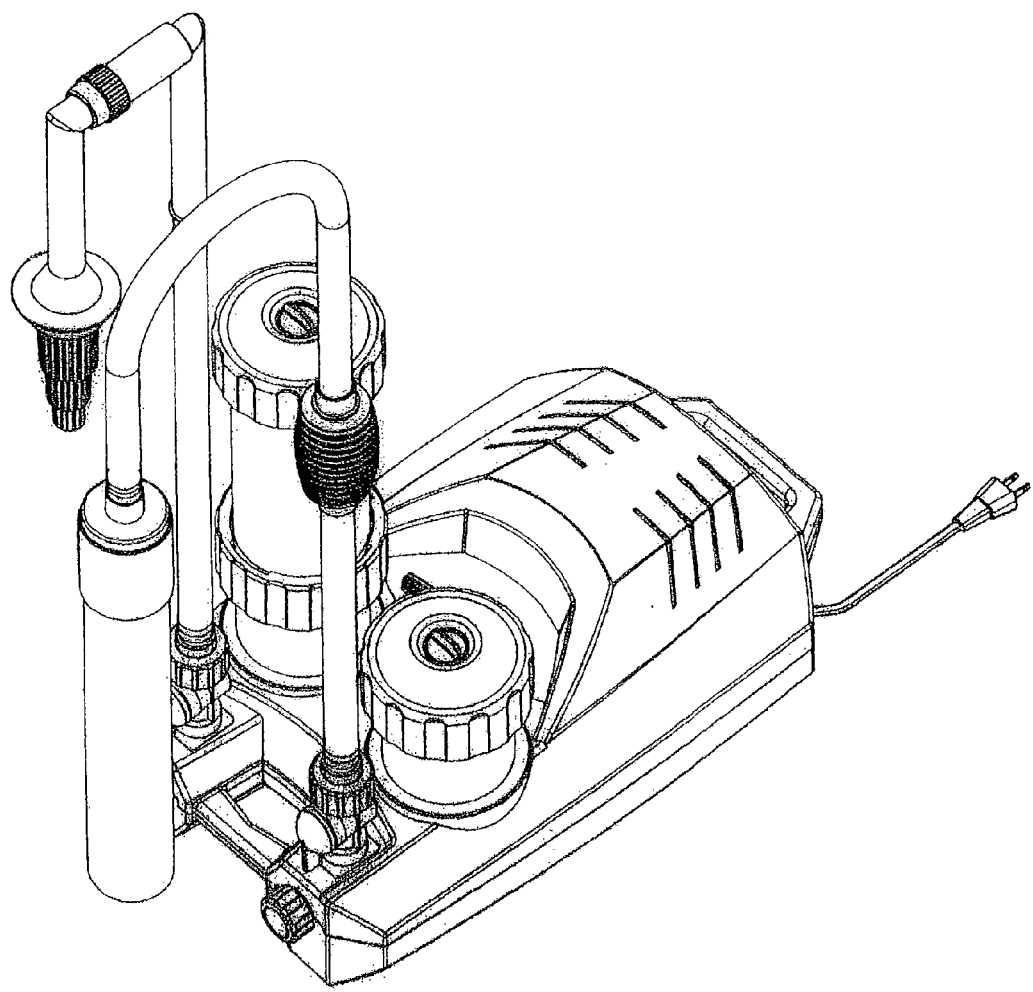

This application claims the benefit of provisional patent application Ser. No. 60/549,097, filed 2004 Mar. 1 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to the maintenance of fish aquariums, specifically in the cleaning of the gravel and removal of fish waste, food debris and unwanted toxins.

2. Prior Art

For years owners of fish aquariums have been using a device called an aquarium siphon for the cleaning and maintaining of their fish aquariums. This was and still is a common product sold by all fish aquarium/pet stores to help in the cleaning and the required monthly maintenance of fish aquariums. Although these devices have helped with the overall maintenance of said fish aquariums, because of the nature of the average consumer and their busy schedule, these devices do not do an adequate job to remove the required levels of debris and maintain a healthy environment in the fish aquarium.

It is a fairly well known fact in the aquarium industry that, when cleaning a fish aquarium, only a certain percentage of the total volume of water can be removed at each cleaning in order to maintain a balance in chemistry necessary for maintaining a healthy fish environment. The amount generally agreed on, by the fish industry, is approximately twenty percent (20%) to twenty five percent (25%) maximum of the total volume of water in the aquarium each cleaning.

Unfortunately most consumers neglect the necessary minimum required monthly maintenance to keep a healthy fish aquarium and, as a result, the aquarium continues to build with excess debris and fish waste. In addition, many consumers over feed their fish which only adds to the problem. When the consumer finally gets around to cleaning the aquarium they are unable to adequately remove this waste, with the present cleaning devices available on the market today, without removing too much water. If they stop as required, the aquarium does not get the proper maintenance. If they remove too much of the water, then the fish aquarium gets out of balance, the chemical levels rise and fish begin to die. Neither of these scenarios is pleasant and the result is, many times, the consumer will either call an aquarium service or give up and take the aquarium down.

Aquarium service is not inexpensive, the average consumer/owner of a small aquarium system (under 100 gallons) cannot afford the monthly service fee. They try to do the best they can on their own, eventually give up and take the aquarium down. Several manufacturers of aquarium products offer filter systems for the daily operation and general removal of floating waste of the fish aquarium. These systems neither vacuum the gravel nor remove dissolved particles. No company to date produces a power cleaning/gravel vacuum dedicated for required service of the fish aquarium. No other product allows the consumer to clean their fish aquarium as required, vacuum the gravel until free of fish waste/food debris without fear of loss of necessary bacteria levels, and allows for continuous cleaning until the job is complete.

This product is so unique that it will help to revitalize the aquarium industry, create new sales of fish aquariums/products for the aquarium/pet stores, and make cleaning and maintaining fish aquariums for the consumer much easier, safer, and a happier experience. Finally, a machine that makes servicing your aquarium a breeze.

SUMMARY OF THE INVENTION

Several objects and advantages of the present invention that address the foregoing needs for a power aquarium cleaning/gravel vacuum described above are:

a) to provide the consumer with the option of attaching different length suction tubes to the suction base for various sizes and heights of the different fish aquariums.

b) to provide a detachable suction base so that the consumer can easily remove the suction base from the suction tube in order to clean the strainer of debris.

c) to provide a suction pump so the consumer can prime the main vacuum unit/motor prior to operation of the machine.

d) to provide a disconnect of the intake assembly from the pre-filter assembly through a male/female disconnect system that allows for easy access of the assembly plus storage of the intake assembly when not in use. (mesh bag included)

e) to provide a shut off valve (ball valve) to decrease the chance of water spilling out during disconnect of the intake assembly from the pre-filter assembly.

f) to provide a drain assembly (including cap/rubber washer) between the intake assembly and pre-filter assembly in case the consumer needs to clear the system of debris or drain the system.

g) to provide a pre-filter tower assembly with gravel trap so as to protect the motor and prevent any large particles from returning to the fish aquarium.

h) to provide a bleeder valve to help with draining of the motor/machine.

i) to provide a motor to insure the proper flow and water pressure necessary for the invention.

j) to provide a micro ball valve assembly so as to allow the consumer to adjust the volume of flow for different sizes of fish aquariums and proper flow due to saturation of the filter cartridge during the cleaning process.

k) to provide an alternate flow path to the motor so that when the consumer adjusts the micro ball valve, the flow of water is continuous and does not put undue back pressure on the motor.

l) to provide a main unit tower that will house a carbon container for detoxification of the water from the fish aquarium.

m) to provide an extension tower that will house a minimum twenty (20) micron filter for the removal of fish waste and food debris.

n) to provide a bleeder valve to assist with the initial priming of the motor/machine.

o) to provide another drain assembly to assist with draining the machine after use.

p) to provide an additional shut off valve (ball valve) to assist when disconnecting the return assembly from the main filter tower.
q) to provide another disconnect through a female/male disconnect system so that the consumer can remove the return assembly unit from the main filter tower for easy cleaning and for storage after use (mesh bag included).
r) to provide an adjustable return assembly so that the consumer can adjust and secure the unit to the various size fish aquariums during operation of the machine.
s) to provide a diffuser unit to disperse the water so as to minimize the stress on the fish and create an even flow of water back to the aquarium.

Further objects and advantages of the power aquarium cleaning/gravel vacuum are to provide the service unit for the consumer for up to one hundred (100) gallon aquarium that will allow the consumer to continuously clean the gravel/aquarium for as long as necessary without removing essential bacteria for aquarium life. In addition, with the aforementioned extension tower, an additional tower may be added with a longer minimum twenty (20) micron filter which will allow the consumer to service aquariums up to and including two hundred (200) gallons (to be offered in an accessory package).

The drain assembly also allows for a garden hose adapter to be added so that the consumer can easily drain saltwater into the toilet or can water their garden in freshwater applications, as fish emulsion is a known plant growth stimulant (to be offered in an accessory package).

The power aquarium cleaning/gravel vacuum, if used properly every month, will provide a safe and effective solution for aquarium maintenance by the consumer and will result in a much more stable and healthier environment for the fish.

The invention is not limited to these needs, objects and advantages.

An embodiments of the invention that attempts to address the foregoing is a power aquarium cleaning/gravel vacuum that is designed to service both saltwater and freshwater fish aquariums, that does not only clean and detoxify aquarium water and removes fish waste/food debris, but the machine actually allows the consumer to vacuum gravel down to #1 gravel size. The machine moves dirty water through an intake assembly, into the main unit and returns clean water through the return assembly back into the fish aquarium. The water passes through the main machine unit, travels through a pre-filter trap for gravel, a minimum twenty (20) micron filter for trapping fish waste/food debris, and a charcoal filter for removal of unwanted toxins. The unit has a micron ball valve for adjusting the flow rate for different size/shape aquariums and allowing for continued flow as the pre-filter and minimum twenty (20) micron filter begin to saturate. The unit allows the user to clean the aquarium as long as necessary while not removing bacteria essential for aquarium life. After the service the consumer may then remove twenty percent (20%) of the water minimum and replace it with the same amount of treated water. The power aquarium cleaning/gravel vacuum can then be drained and stored until the next needed service of the fish aquarium.

DRAWINGS—FIGURES

Figure 2:
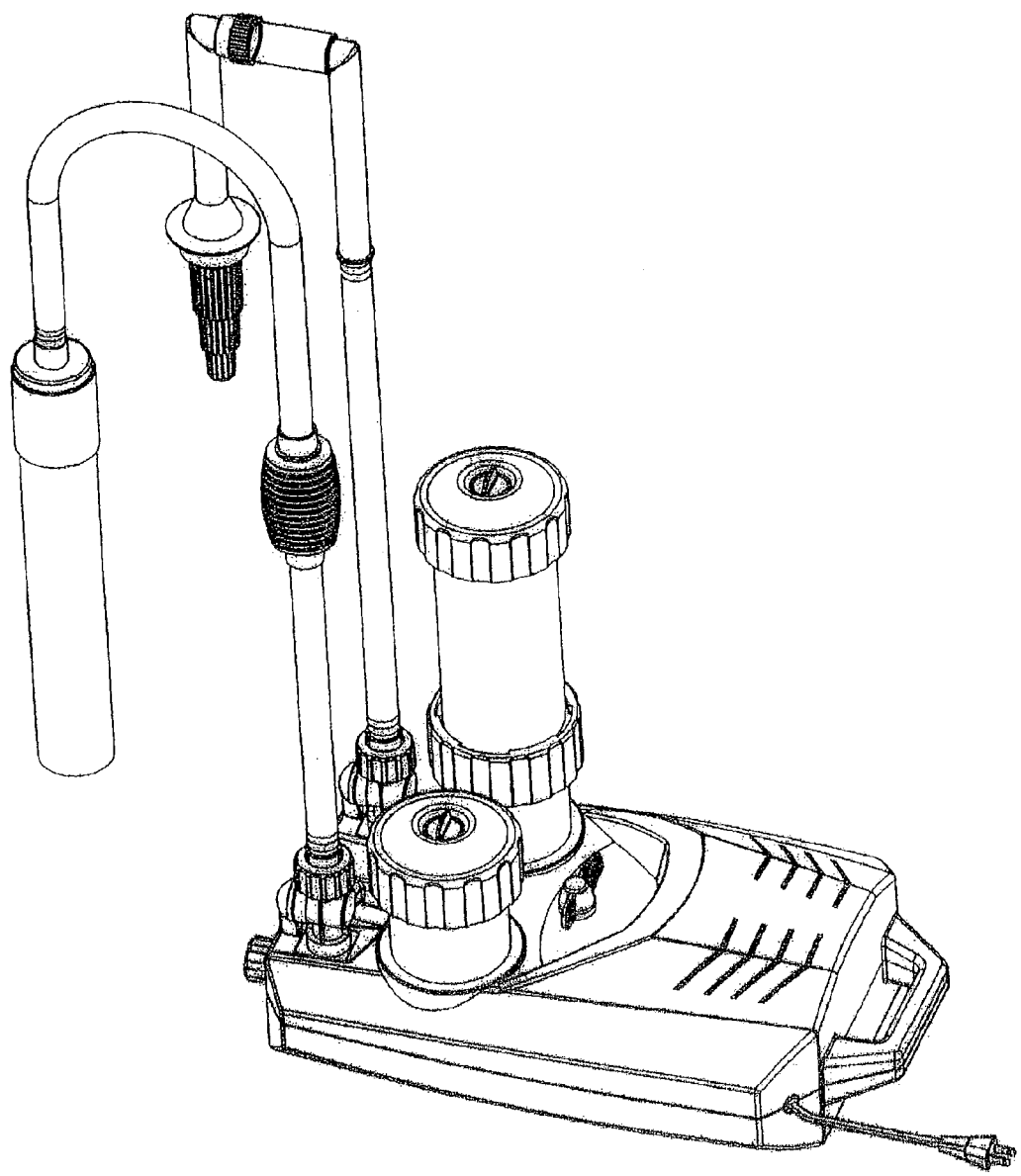
Figure 3:
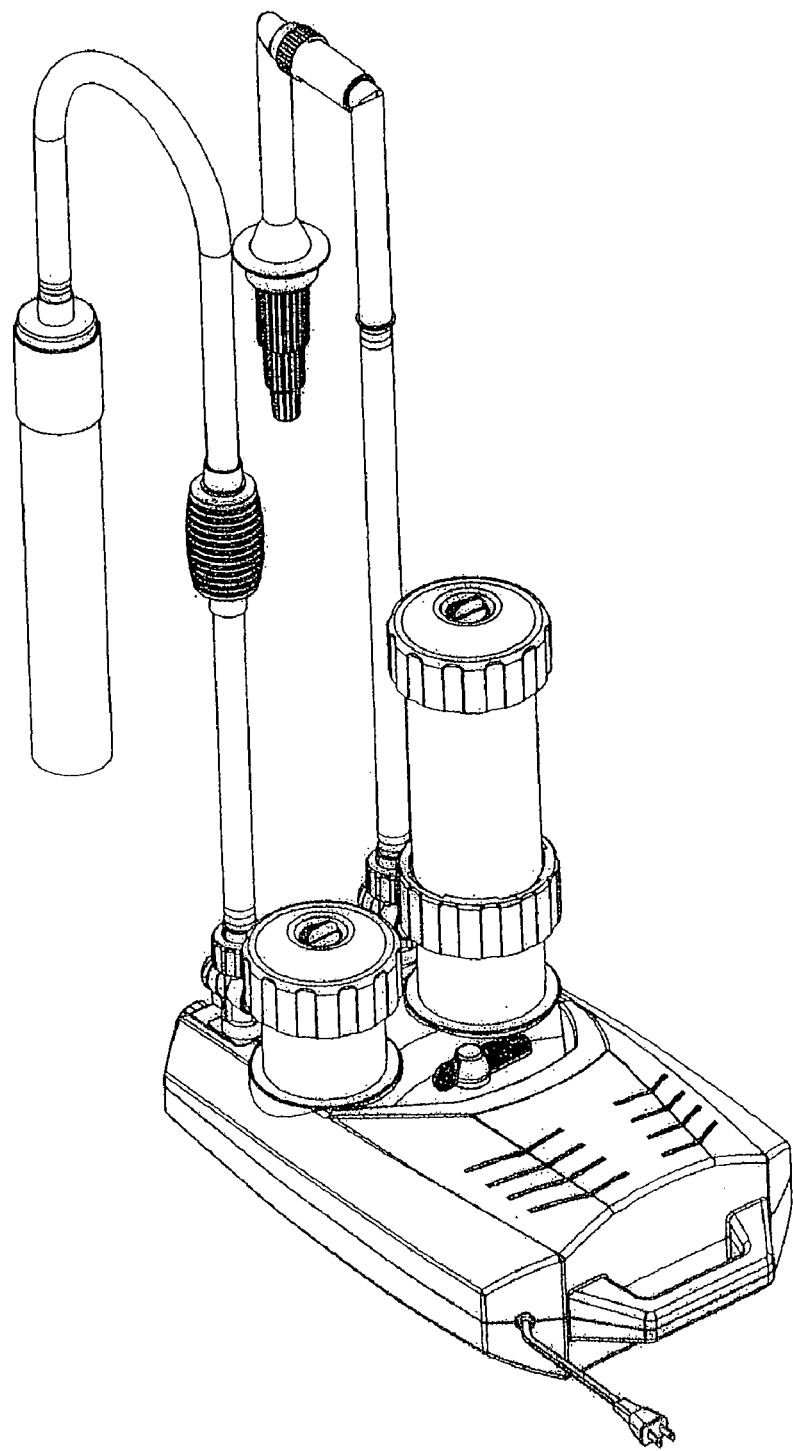
Figure 4:
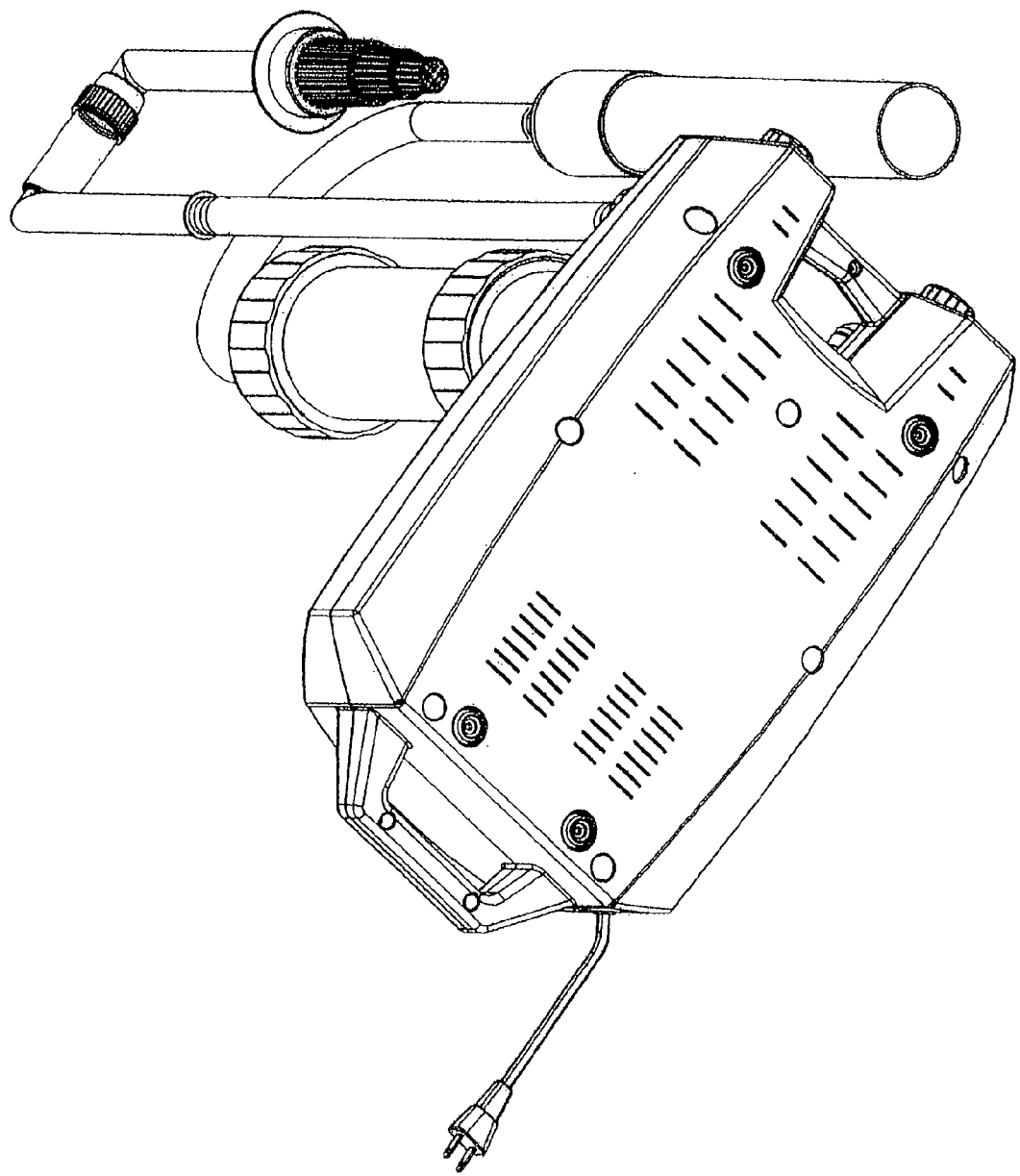
Figure 5:
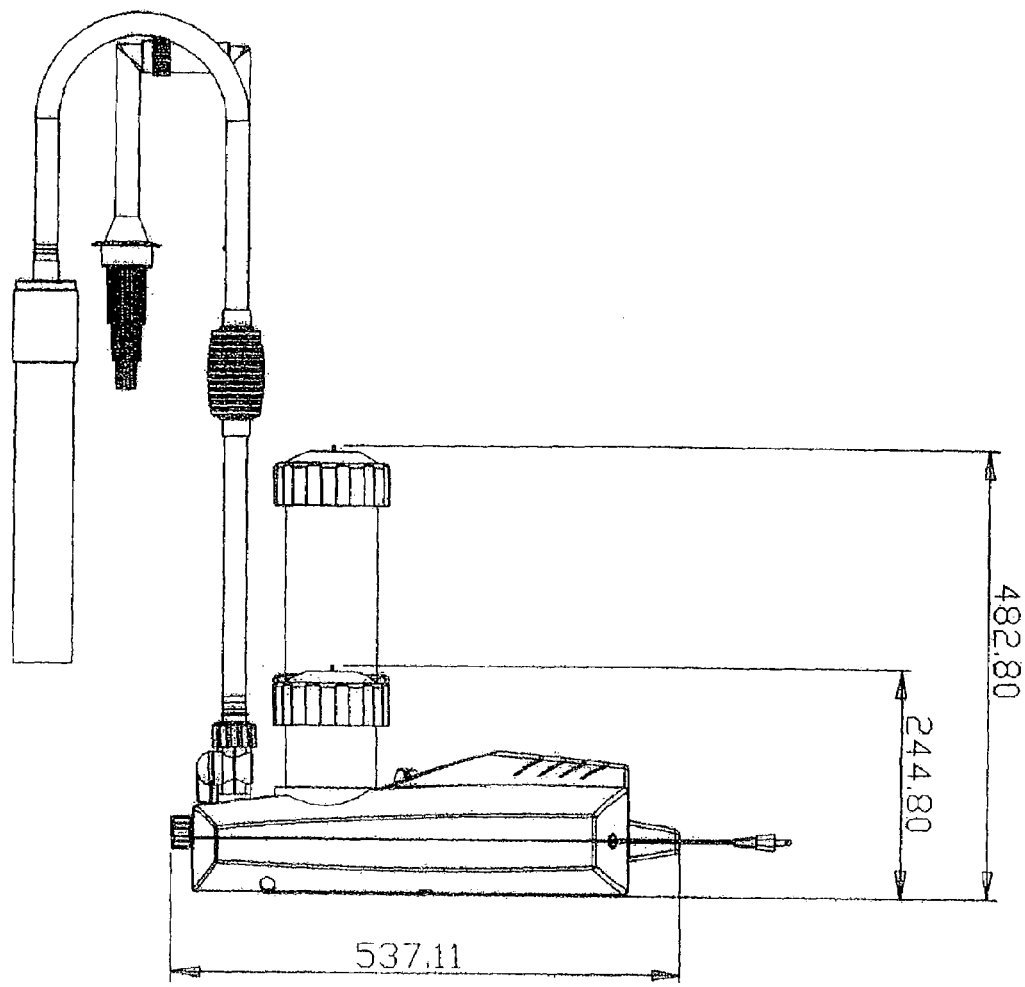
Figure 6:
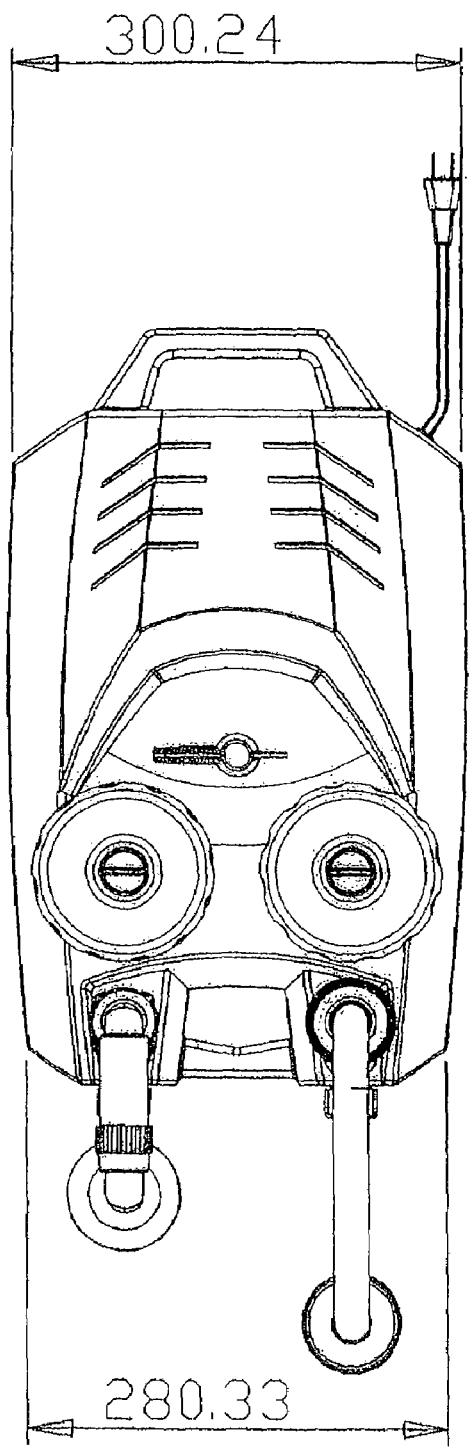
Figure 7:
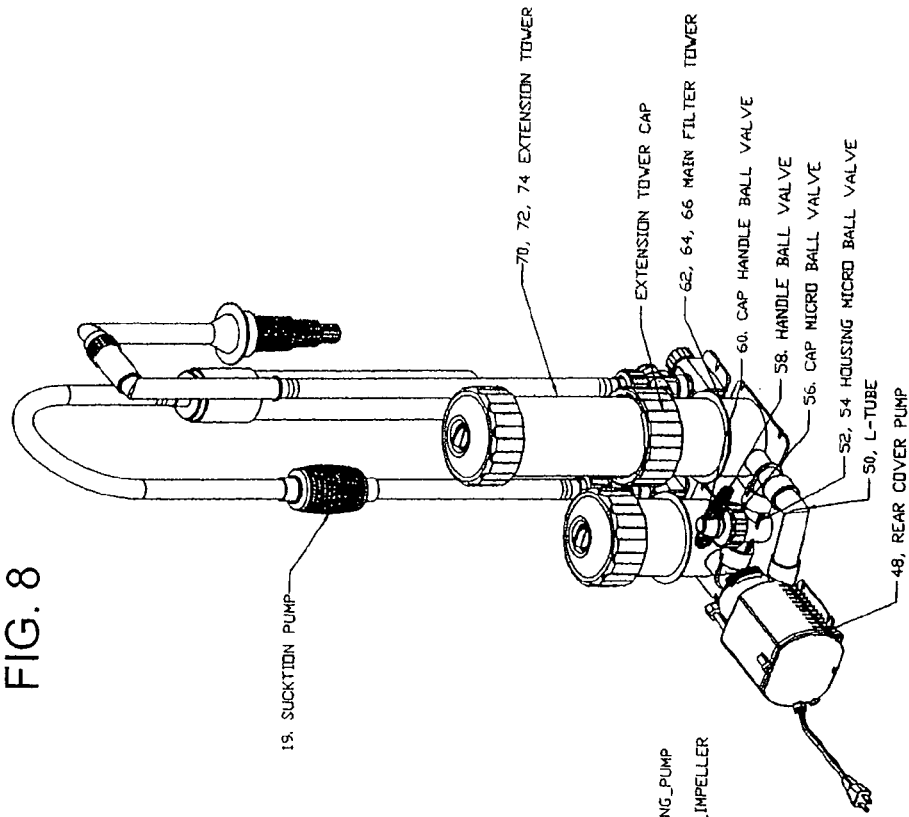
Figure 8:
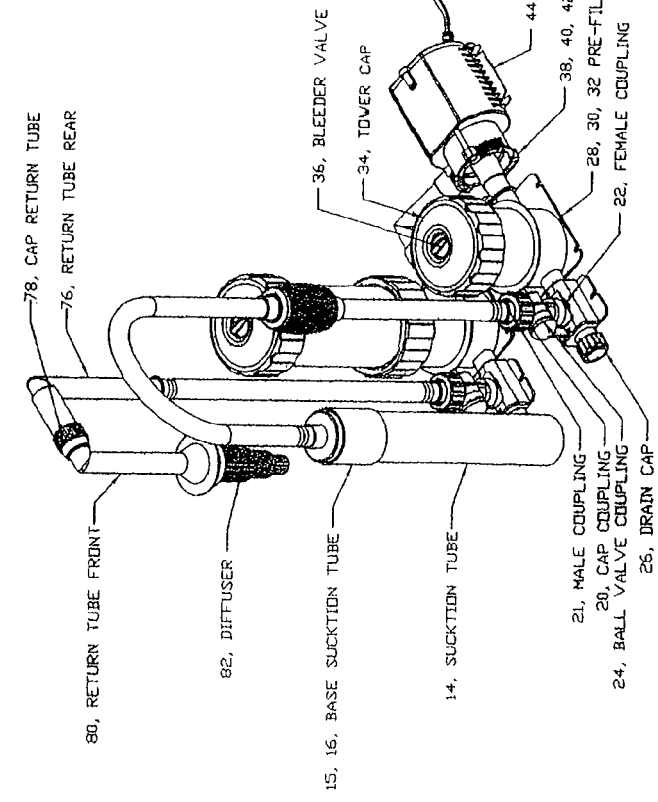
Figure 9:
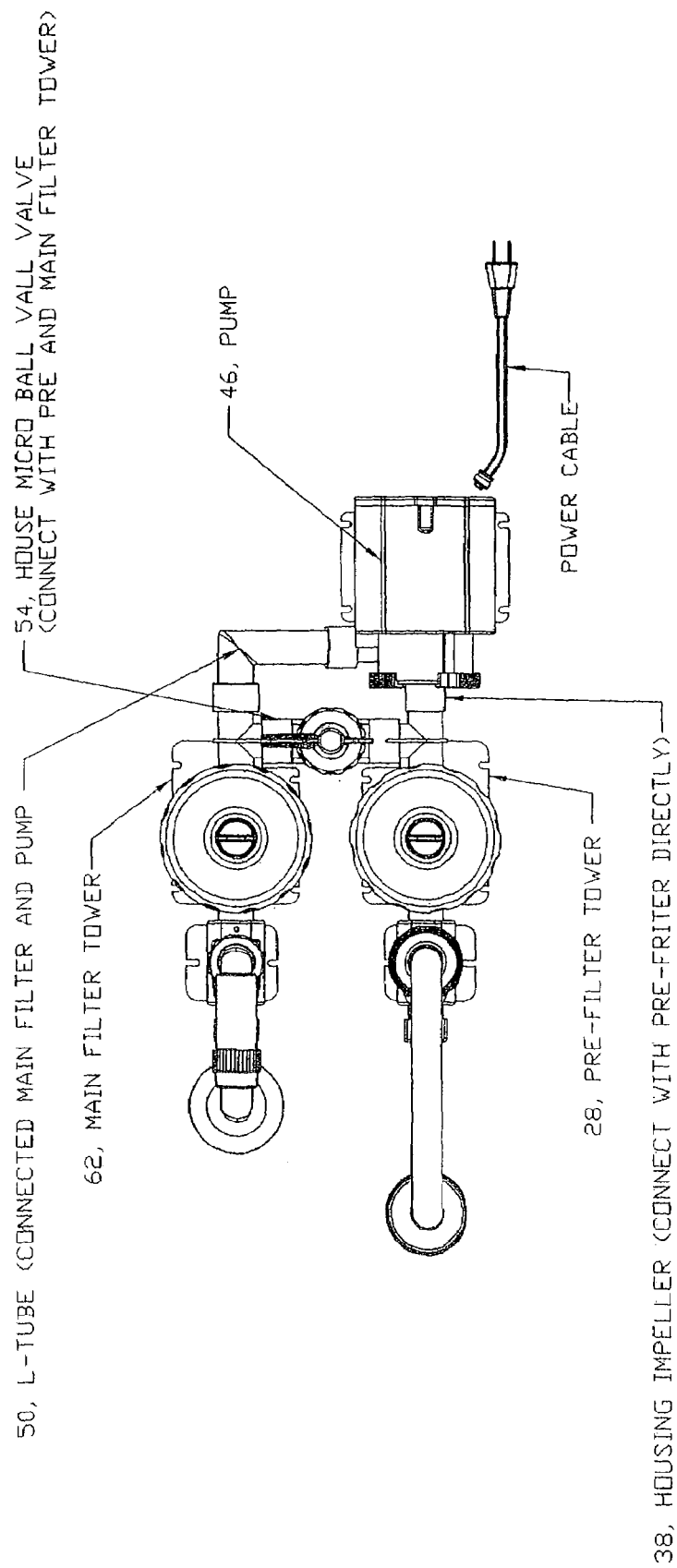
Figure 10:
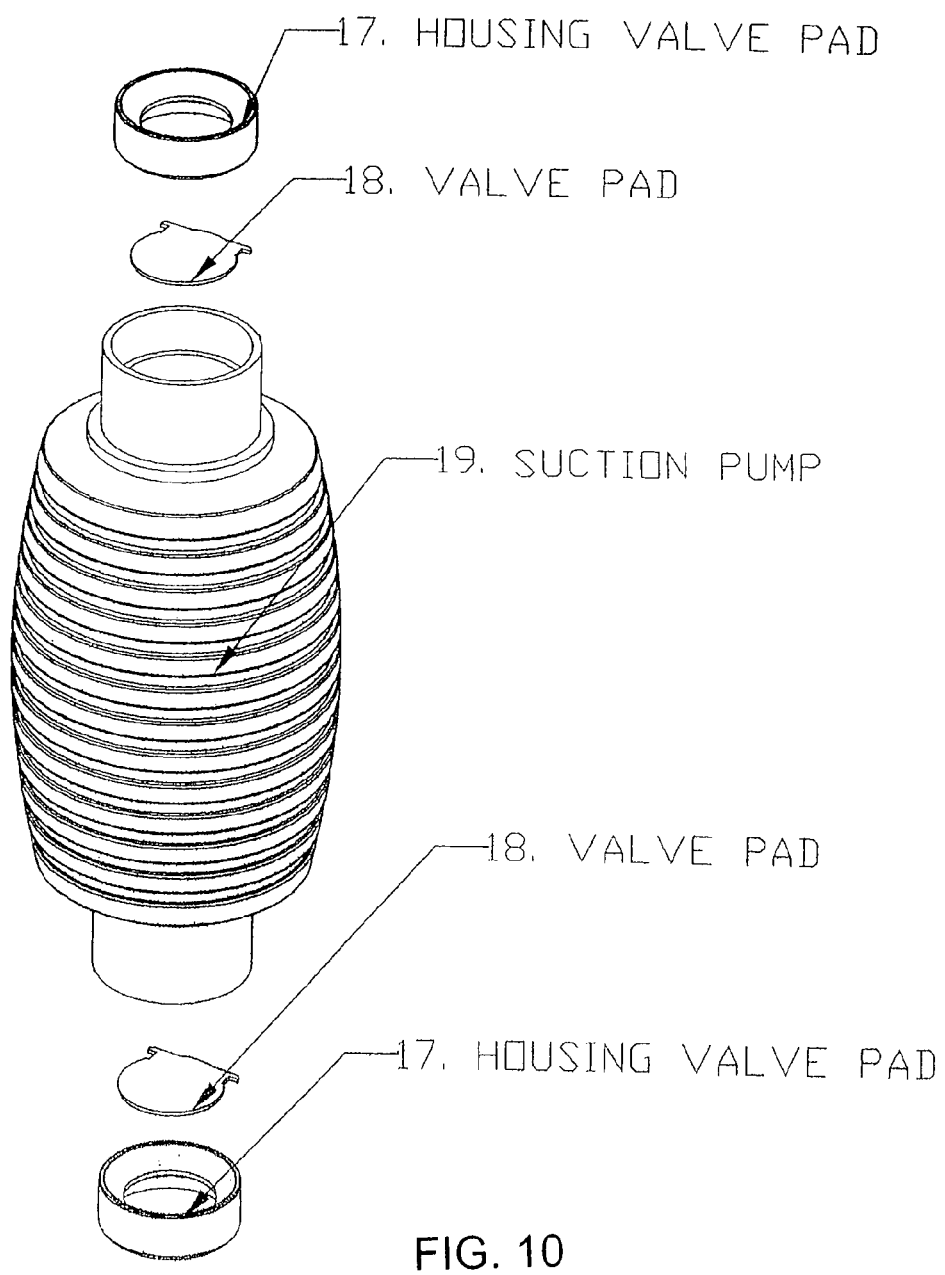
Figure 11:
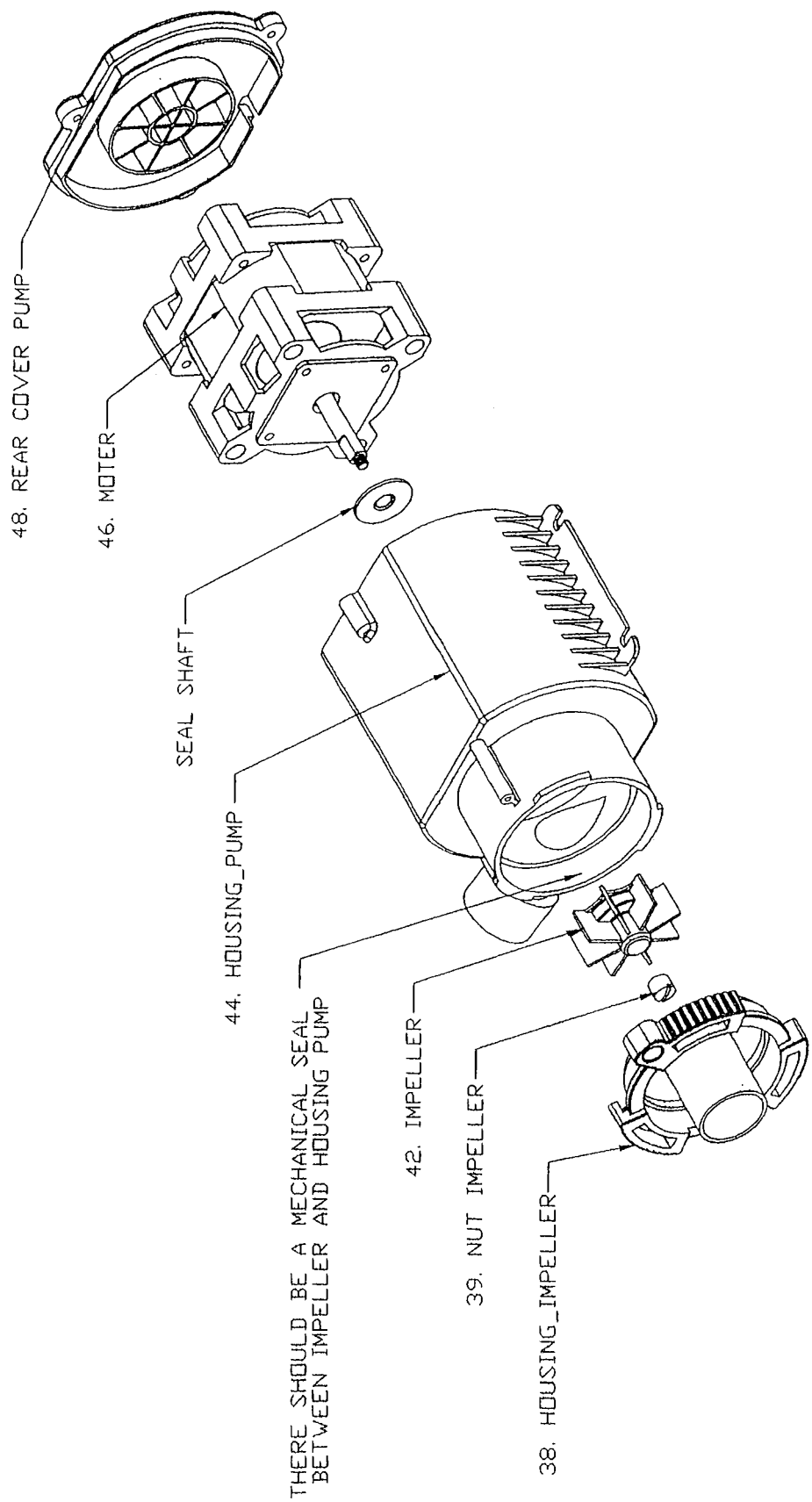
Figure 12:
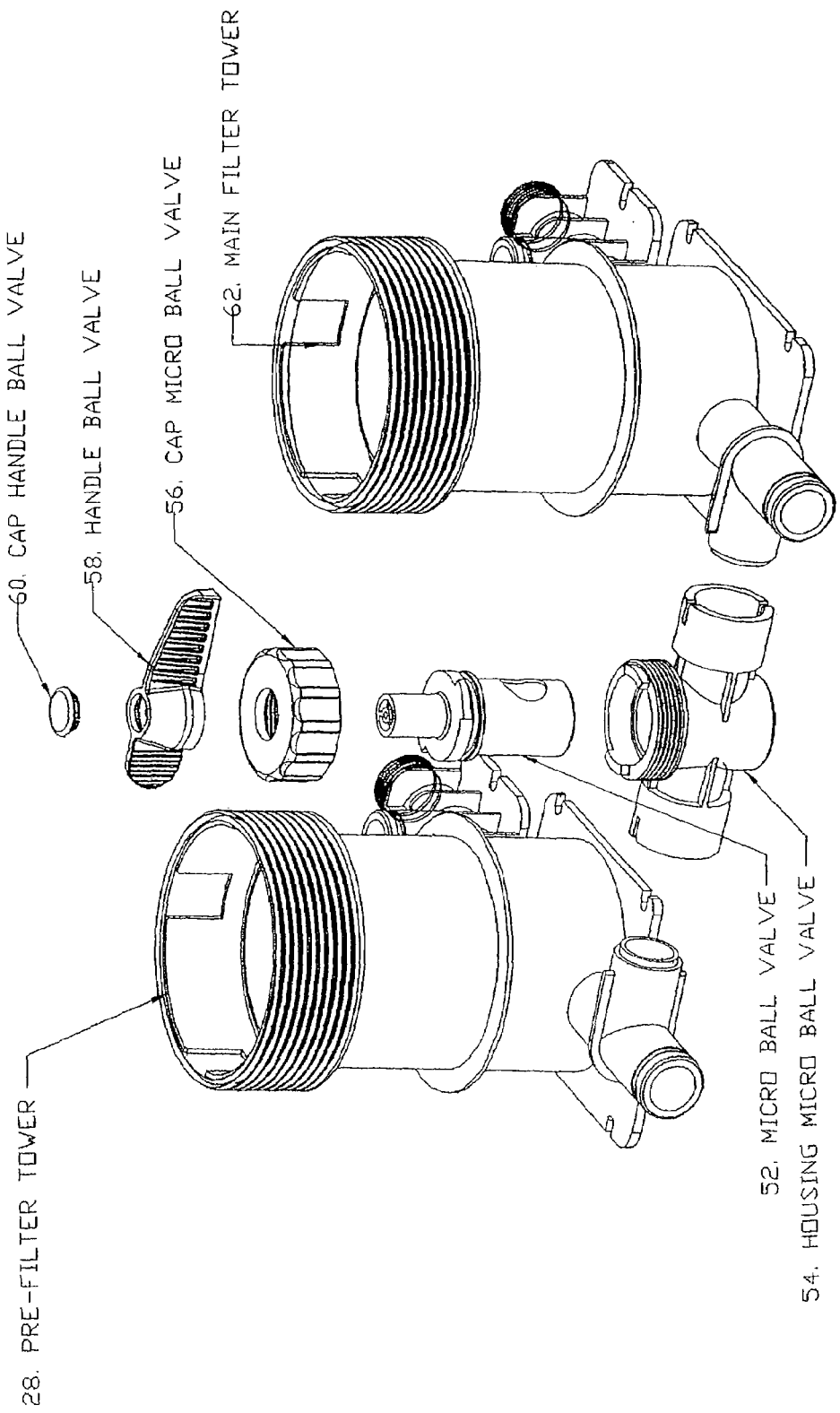
Figure 13:
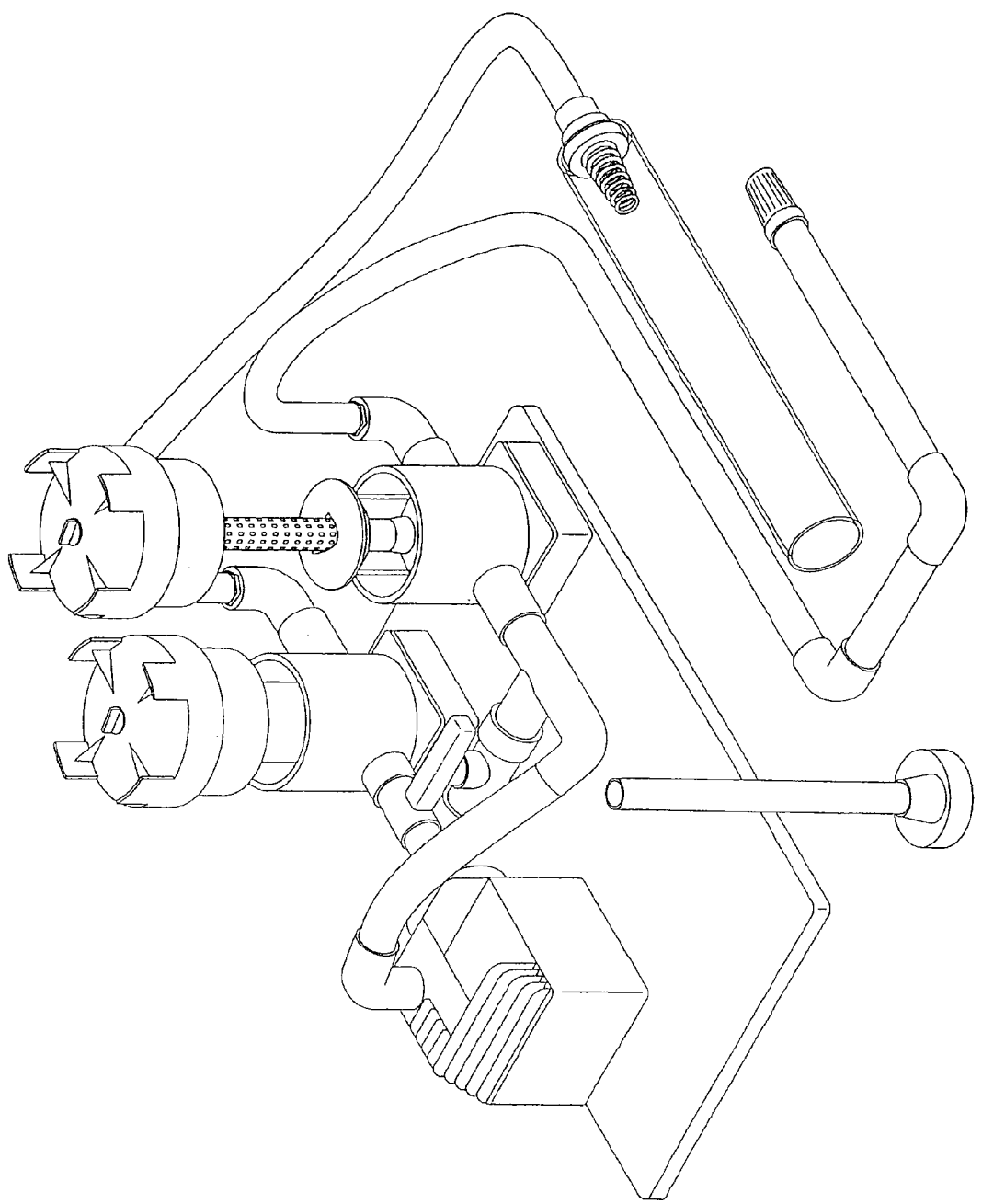

FIG. 1 to show an angled front view of the complete final design of the power aquarium Cleaning/gravel vacuum.
FIG. 2 to show an angled side view of the complete final design of the power aquarium Cleaning/gravel vacuum.
FIG. 3 to show an angled rear view of the complete final design of the power aquarium cleaning/gravel vacuum.
FIG. 4 to show an angled bottom view of the complete final design of the power aquarium cleaning/gravel vacuum.
FIG. 5 to show the overall height and length dimensions, from a side view, of the complete final design of the power aquarium cleaning/gravel vacuum.
FIG. 6 to show the overall width dimensions, from a top view, of the complete final design of the power aquarium cleaning/gravel vacuum.
FIG. 7 to show a listing of the names of various components, from a front angled view, of the final design of the power aquarium cleaning/gravel vacuum without the top and bottom housing.
FIG. 8 to show a listing of the names of various components, from a rear angled view, of the final design of the power aquarium cleaning/gravel vacuum without the top and bottom housing.
FIG. 9 to show a listing of the names of various components, from a top view, of the final design of the power cleaning/gravel vacuum without the top and bottom housing.
FIG. 10 to show a listing of the names of various components of the suction pump assembly.
FIG. 11 to show a listing of the names of various components of the motor assembly.
FIG. 12 to show a listing of the names of various components of the micro valve assembly plus pre-filter tower and main filter tower.
FIG. 13 to show the original concept, as described in the provisional patent, of the power aquarium cleaning/gravel vacuum.

DRAWINGS—REFERENCE NUMERALS

| | |
|---|---|
| 14 Suction Tube (Suck Tube) | 15 Strainer (Base Suck Tube) |
| 16 Suction Tube (Base Suck Tube) | 17 Housing Valve Pad (Suck Pump) |
| 18 Valve Pad (Suck Pump) | 19 Suction Pump (Suck Pump) |
| 20 Cap Connector (Cap Coupling) | 21 Barb Connector (Male Coupling) |
| 22 Housing Connector (Female Coupling) | 24 Ball Valve (Coupling) |
| 26 Drain Cap | 28 Pre-Filter Tower |
| 30 Pre-Filter Trap | 32 Cap - Top (Pre-Filter Trap) |
| 34 Tower Cap | 36 Bleeder Valve |
| 38 Housing - Impeller | 40 Nut - Impeller |
| 42 Impeller | 44 Housing - Pump |
| 46 Motor (Pump) | 48 Rear Cover (Pump) |
| 50 L - Tube | 52 Micro Ball Valve |
| 54 Housing - Micro Ball Valve | 56 Cap - Micro Ball Valve |
| 58 Handle - Micro Ball Valve | 60 Cap - Micro Ball Valve |
| 62 Main Filter Tower | 64 Carbon Container |
| 66 Cap - Top (Carbon Container) | 68 Extension Tower Cap (Connector) |
| 70 Extension Tower | 72 Filter Cartridge |
| 74 Cap (Filter Cartridge) | 76 Return Tube (Rear) |
| 78 Return Tube Connector (Cap) | 80 Return Tube (Front) |
| 82 Diffuser | 84 Housing (Top) |
| 86 Housing (Bottom) | |

DETAILED DESCRIPTION

Original Embodiment—FIG. 13

An original embodiment of the complete power aquarium cleaning/gravel vacuum as filed with the United States Patent and Trademark Office on Mar. 1, 2004, Provisional Patent Application Ser. No. 60/549,097. The embodiment represents the inventor's original concept and design. This figure is included to help in the understanding of the changes made to improve said embodiment and, while the improvements have added to easier use of the power aquarium cleaning/gravel vacuum by the consumer, the concepts and functions are basically the same.

Preferred Embodiment—FIGS. 1, 2, 3, and 4

A preferred embodiment of the complete power aquarium cleaning/gravel vacuum is illustrated in FIG. 1 (angled front view), FIG. 2 (angled side view, FIG. 3 (angled rear view), and FIG. 4 (angled bottom view) Please note the drastic change in appearance of the preferred embodiment verses the embodiment of the original concept. The original embodiment is a functional but rather plain design. The preferred embodiment looks much more state of the art and encompasses many more features, as well as making the power aquarium cleaning/gravel vacuum much easier for use by the consumer. The invention is not limited to this embodiment.

Overall Dimensions—FIGS. 5 and 6

An overall illustration of the dimensions of the preferred embodiment of the complete power aquarium cleaning/gravel vacuum. FIG. 5 illustrates the overall height and length measurements from a side view. FIG. 6 illustrates the overall width measurements from a top view. While these illustrations show the preferred dimensions, the design of the complete power aquarium cleaning/gravel vacuum allows for various size and shape of the unit (machine), due to different accessory packages to be offered. The invention is not limited to these dimensions.

Detailed Description—FIGS. 7, 8, 9, 10, 11, and 12

A preferred embodiment of the present complete power aquarium cleaning/gravel vacuum is illustrated in FIGS. 7 through 12. In the complete preferred embodiment the majority of all components are molded plastic, such as polypropylene, unless otherwise specified in the aforementioned detailed description or operations to follow of the power aquarium cleaning/gravel vacuum. Other materials can be used.

In FIG. 7, a suction tube 14 is press fit into a suction base 16 which houses a strainer 15. The suction base is connected to the suction pump 19 (FIGS. 8 and 10 by a length of ribbed flexible vinyl tubing (shown in FIGS. 7 & 8 but not labeled). Ribbed flexible vinyl tubing is a common in the aquarium industry and, as such, is not listed in the reference numerals. The suction pump is comprised of a valve housing pad 17 (FIG. 10) and a valve pad 18 (FIG. 10). The valve housing and pad are press fit in each end of the suction pump. The ribbed tubing is press fit to the suction base and to both ends of the suction pump in order to seal the components.

The suction pump is connected to a coupling barb connector 21 (FIG. 7) by a length of ribbed flexible vinyl tubing. The ribbed tubing is press fit to the coupling barb connector. A cap connector 20 secures the ribbed tubing to a housing connector 22 (female connector) by sliding over the ribbed tubing and screwing the cap connector down tight to the housing connector. In addition, there is a ball valve 24 which is inserted into the housing connector and secured by means of a rubber gasket and locking system.

The housing connector is press fit, by means of a rubber gasket and locking system to a pre-filter tower 28 (FIG. 7). A drain cap 26 is screwed on to the pre-filter tower and tightened down by means of a rubber gasket. The pre-filter tower houses a pre-filter trap 30 and pre-filter trap cap (top) 32. The pre-filter trap and top are secured inside the pre-filter tower by means of a tower cap 34. A bleeder valve 36 is screwed into the tower cap and secured by means of a rubber gasket.

An impeller housing 38 (FIGS. 7 and 11) is press fit to the pre-filter tower by means of a rubber gasket. An impeller 42 is enclosed in the impeller housing and attached to a pump (motor) 46 by means of a nut 40. The motor is enclosed a pump housing 44 and sealed from the main flow of water by means of a shaft seal. The motor is enclosed to the pump housing by means of a rear cover 48 (FIGS. 8 and 11). The complete motor assembly is fastened together with long screws and washers. The motor is attached to a power cord (not listed in the reference numerals) that exits through the rear cover. The pump housing is connected to the main tower 62 (FIGS. 8, 12) by a L-tube 50. The L-tube is press fit to both the pump housing and the main filter by means of a rubber gasket.

A micro ball valve housing 54 (FIGS. 8 and 12) is press fit to both the pre-filter tower and main tower by means of rubber gasket. A micro ball valve 52 (FIG. 12) is inserted into the micro ball valve housing. A cap 56 screws down over the micro ball valve and secures it to the micro ball valve housing by means of a rubber gasket. A handle 58 is secured to the micro ball by means of a screw. A cap (cover) 60 is snapped over the handle.

The main filter tower houses a carbon container 64 (FIG. 8) and carbon container cap (top) 66. An extension tower cap 68 is screwed down to the main filter tower and sealed by means of a rubber gasket. An extension tower 70 is then snapped down into the extension cap and sealed by means of a rubber gasket. The extension tower houses a filter cartridge 72 and filter cartridge cap (top) 74. The extension tower is then sealed by means of another tower cap 34 and bleeder valve 36 (FIG. 7). Another housing connector assembly 21 though 26 is connected to the other end of the main filter tower. The assembly is attached to a return tube (rear) 76 by means of a length of ribbed flexible vinyl tubing that is press fit to the return tube (rear).

The return tube (rear) is connected to a return tube (front) 80 by means of an adjustable return tube connector (cap) 78. The return tube connector slips over the return tube (front). The return tube (front) then slides into the return tube (rear) and the return tube connector (cap) screws down to the return tube (rear). A diffuser 82 is then press fit into the end of the return tube (front).

The preferred embodiment of the power aquarium cleaning/gravel vacuum is then enclosed in housing (top) 84 and housing (bottom) 86. This completes the detailed description of the total embodiment of the power aquarium cleaning/gravel vacuum.

The invention is not limited to the details of this embodiment.

Operation—FIGS. 7, 8, and 9

The power aquarium cleaning/gravel vacuum is a unique machine that has many benefits over previous ways of doing the required monthly maintenance of a fish aquarium.

The manner that the consumer uses the machine is to first immerse the suction tube/suction base assembly 14, 15, 16 (FIG. 7) into one end of the aquarium that the consumer desires to clean. The preferred embodiment of the complete power aquarium cleaning/gravel vacuum will be located below said aquarium and on the floor. The return assembly 76, 78, 80, 82 (FIG. 7) should be placed and secured at the other end of said aquarium. The consumer will then open all micro ball valve assemblies 24, 52 though 60 (FIGS. 7 & 8 and the bleeder valves 36 (FIG. 7) on the main filter tower.

The bleeder valve on the pre-filter tower is to be closed. The consumer should make sure that all connections are hand tight and proceed to step two.

The consumer squeezes the suction pump several times to begin the flow of water from the aquarium to the machine. As the unit begins to fill with water, the bleeder valve on the main filter tower will begin to hiss air out as the water flows through pre-filter assembly 29 through 36 (FIG. 7), the pump (motor) assembly 38 through 50 (FIGS. 7, 8), the micro valve assembly 52 through 60 (FIG. 8), and the main filter tower assembly 62 through 74. The bleeder valve on the main tower assembly will begin to spill water out. The consumer then is to close said bleeder valve as the unit is now primed and ready for operation.

The consumer will now plug the power cord into an outlet. It is highly suggested that the machine is plugged into a power module with off/on switch and then a power outlet. The power aquarium cleaning/gravel vacuum will, once plug in and with the power module in the on position, begin to operate.

The consumer can begin to close the micro valve assembly 52 through 60. The water will begin to pull from the suction assembly through the main unit and back through the return assembly 76 through 82 (FIG. 7). The consumer will then put the suction tube assembly into the gravel and adjust the micro valve assembly 52 through 60 until the gravel comes up into the suction tube approximately one quarter of the full length of the suction tube. The consumer can pull out and re-insert the tube into different parts of the aquarium to clean different sections of the gravel. Thus, the gravel can be cleaned while still in the aquarium.

The consumer can now clean/gravel vacuum the aquarium, as necessary, until the fish waste and food debris are properly removed. The dirty water will travel through the machine, be filtered and detoxified, and return to the aquarium clean water. After use, turn off and unplug the unit. As shown in FIG. 9, an alternate flow path to the pump is provided from a flow line downstream of the pump, such that when the valve is used to adjust the volume of flow, back pressure on the pump is reduced.

After completion of the maintenance service, said consumer can drain, clean, and store the complete power gravel vacuum until next needed. To drain the unit, simply shut the two (2) ball valves 24 (FIG. 7) to the off position. The two ball valves are located on the front end of the pre-filter tower 28 and main tower 62 (FIG. 8). Drain and disconnect the suction tube assembly 14 through 21 (FIG. 7) and the return assembly 20, 21, 76 through 82. Take unit to sink and drain machine be removing both drain caps 26 and opening both bleeder valves 36. After draining unit, unscrew both tower caps 34 and remove pre-filter trap assembly 30, 32, remove carbon container assembly 64, 66, and remove filter cartridge assembly 72, 74. Rinse all assemblies and the main unit with warm water, pat dry and let sit overnight. Store components in mesh bags (included) until next use.

The invention can be used in different ways than those discussed above and is not limited to these operational details.

Advantages

From the description above, a number of advantages of the power aquarium cleaning/gravel vacuum become evident:

(a) The structure and the material of the suction tube are such that various lengths can be provided for different size and shape aquariums. Since this component detaches from the suction base, this is a clear improvement over siphon products as it allows the consumer to use one (1) machine with multiple attachments for various size and shape aquariums.

(b) The suction base detaches from the suction tube which allows for easy access and cleaning of the strainer. This superior design is not offered in any other known siphon products.

(c) The suction pump is a superior way of priming of the pump and main unit prior to operation.

(d) The male/female disconnect system makes it easy to disconnect the intake assembly and return assembly from the main unit. This is a clear advantage for cleaning these assemblies and even more convenient for storage of the assemblies after use. (Mesh bags included)

(e) The ball valves provide a great advantage to prevent spillage of water while disconnecting the previously mentioned assemblies. In case one of these assemblies happens to dislodge from the aquarium while the unit is in use, turning off the valve is a quick and safe method of preventing further mishap.

(f) The drain caps provide a quick and easy way of cleaning out the main unit after use, as well as, for providing a method of attachment of a garden hose for removing the required amount of water change (20 percent minimum).

(g) The pre-filter trap is an effective way of preventing gravel from entering the impeller assembly and doing possible damage to the motor.

(h) The micro ball valve assembly is a superior design in that it allows for a quick and easy method of adjusting the flow rate of the aquarium water during cleaning as the filter saturates with debris. Another advantage of the micro ball valve is that it allows for adjustment of the gravel height in the suction tube due to various size/shape aquariums.

Not all embodiments of the invention will exhibit all of these advantages.

ALTERNATIVE EMBODIMENTS

The invention is in no way limited to the specifics of any particular embodiments and examples disclosed herein. For example, the terms "preferably," "preferred embodiment," "one embodiment," "this embodiment," "alternative embodiment," "alternatively" and the like denote features that are preferable but not essential to include in embodiments of the invention. Many other variations are possible which remain within the content, scope and spirit of the invention, and these variations would become clear to those skilled in the art after perusal of this application.

What is claimed is:

1. A gravel vacuum, comprising:
  a pump;
  a detachable suction base connected to the pump and to which a suction tube is attached;
  a filter connected to the suction base;
  a return assembly;
  at least one valve carried on the suction base; and
  an alternate flow path to the pump from a flow line downstream of the pump;
  wherein the pump impels a flow of water from the suction tube, through the filter, and out the return assembly;
  wherein the valve permits adjustment of volume of the flow for different sizes of fish aquariums; and
  wherein the alternate flow path reduces back pressure on the pump when the valve is used to adjust the volume of the flow.

2. A gravel vacuum as in claim 1, further comprising the suction tube attached to said suction base, the suction tube having sufficient diameter for gravel to fit inside.

3. A gravel vacuum as in claim 2, wherein different length suction tubes can be attached to the suction base.

4. A gravel vacuum as in claim 1, further comprising a strainer in the suction base.

5. A gravel vacuum as in claim 1, further comprising a squeezable suction pump by which the cleaner can be primed.

6. A gravel vacuum as in claim 1, further comprising a pre-filter assembly that the water flows through before the filter.

7. A gravel vacuum as in claim 6, wherein the pre-filter assembly includes an intake assembly connected by a male/female disconnect system.

8. A gravel vacuum as in claim 7, further comprising a shut off valve that decreases a chance of water spilling out during disconnect of the intake assembly from the pre-filter assembly.

9. A gravel vacuum as in claim 7, further comprising a drain assembly between the intake assembly and pre-filter assembly.

10. A gravel vacuum as in claim 1, further comprising a gravel trap that protects a motor in the pump.

11. A gravel vacuum as in claim 1, further comprising a pre-filter for the filter and a gravel trap that protects the pre-filter.

12. A gravel vacuum as in claim 1, wherein the filter includes a carbon container for detoxification of the water and a minimum twenty (20) micron filter for the removal of fish waste and food debris from the water.

13. A gravel vacuum as in claim 1, further comprising a shut off valve to assist when disconnecting the return assembly from the filter tower.

14. A gravel vacuum as in claim 1, wherein the return assembly is adjustable and includes a return tube and a diffuser.

15. A method of using a gravel vacuum, the gravel vacuum including a pump, a detachable suction base connected to the pump to which a suction tube is attached, a filter connected to the suction base, a return assembly, at least one valve carried on the suction base, and an alternate flow path to the pump from a flow line downstream of the pump, wherein the pump impels a flow of water from the suction tube, through the filter, and out the return assembly, the method comprising the steps of attaching a suction tube to the suction base;
immersing the suction tube into an aquarium;
turning on the pump;
inserting the suction tube into the gravel; and
using the valve to adjust a volume of the flow for different sizes of fish aquariums;

wherein the alternate flow path reduces back pressure on the pump when the valve is used to adjust the volume of the flow;

whereby the gravel in the suction tube is cleaned while still in the aquarium.

16. A method as in claim 15, wherein the suction tube has a sufficient diameter for gravel to fit inside.

17. A method as in claim 16, wherein different length suction tubes can be attached to the suction base.

18. A method as in claim 15, wherein the gravel vacuum further includes a strainer in the suction base.

19. A method as in claim 15, wherein the gravel vacuum further includes a squeezable suction pump, and wherein the method further comprises priming the cleaner with the squeezable suction pump.

20. A method as in claim 15, wherein the gravel vacuum further includes a shut off valve, and wherein the method further comprises using the shut off valve to assist when disconnecting the return assembly from the filter tower.

21. A method as in claim 15, wherein the return assembly is adjustable and further includes a return tube and a diffuser, and wherein the method further comprises adjusting the return assembly.

* * * * *